(12) United States Patent
Jang et al.

(10) Patent No.: US 12,382,997 B2
(45) Date of Patent: Aug. 12, 2025

(54) AEROSOL GENERATING DEVICE

(71) Applicant: KT&G CORPORATION, Daejeon (KR)

(72) Inventors: Chul Ho Jang, Daejeon (KR); Gyoung Min Go, Daejeon (KR); Hyung Jin Bae, Daejeon (KR); Jang Won Seo, Daejeon (KR); Min Seok Jeong, Daejeon (KR); Jong Seong Jeong, Daejeon (KR); Jin Chul Jung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 0 days.

(21) Appl. No.: 17/922,917

(22) PCT Filed: Jun. 21, 2022

(86) PCT No.: PCT/KR2022/008769
§ 371 (c)(1),
(2) Date: Nov. 2, 2022

(87) PCT Pub. No.: WO2023/287047
PCT Pub. Date: Jan. 19, 2023

(65) Prior Publication Data
US 2024/0215650 A1    Jul. 4, 2024

(30) Foreign Application Priority Data
Jul. 13, 2021 (KR) .................... 10-2021-0091688

(51) Int. Cl.
*A24F 47/00* (2020.01)
*A24F 40/53* (2020.01)
(Continued)

(52) U.S. Cl.
CPC .............. *A24F 40/53* (2020.01); *G01S 15/04* (2013.01); *G01S 15/88* (2013.01)

(58) Field of Classification Search
CPC .......... A24F 40/50; A24F 40/51; A24F 40/53; A24F 40/57
See application file for complete search history.

(56) References Cited

U.S. PATENT DOCUMENTS 6,155,268 A   12/2000   Takeuchi
11,278,263 B2  3/2022   Hyeon
(Continued)

FOREIGN PATENT DOCUMENTS

CN   108882750 A   11/2018
CN   110352014 A   10/2019
(Continued)

OTHER PUBLICATIONS

Communication dated Nov. 13, 2023 issued by the Korean Patent Office in application No. 10-2021-0091688.
(Continued)

*Primary Examiner* — Eric Yaary
(74) *Attorney, Agent, or Firm* — Sughrue Mion, PLLC

(57) ABSTRACT

An aerosol-generating device may include an accommodation space where an aerosol-generating article is accommodated, a heater configured to generate aerosol by heating the aerosol-generating article, a transducer configured to output ultrasonic waves toward the accommodation space, receive ultrasonic waves reflected from the accommodation space, and generate electric signals corresponding to the received ultrasonic waves, and a processor configured to determine a type of the aerosol-generating article accommodated in the accommodation space based on the electric signals gener-
(Continued)

ated by the transducer, and control an operation of the heater based on the determined type of the aerosol-generating article.

11 Claims, 10 Drawing Sheets

(51) Int. Cl.
*G01S 15/04* (2006.01)
*G01S 15/88* (2006.01)

(56) References Cited

U.S. PATENT DOCUMENTS

| | | | |
|---|---|---|---|
| 11,457,661 B2 | 10/2022 | Han | |
| 11,541,193 B2 | 1/2023 | Lee | |
| 2010/0163063 A1* | 7/2010 | Fernando | A24F 40/85 131/184.1 |
| 2018/0271149 A1* | 9/2018 | Holtz | G06K 7/1417 |
| 2019/0335816 A1 | 11/2019 | Yamada et al. | |
| 2020/0260790 A1 | 8/2020 | Kaufman et al. | |
| 2020/0281254 A1 | 9/2020 | Rogan | |
| 2020/0352246 A1 | 11/2020 | Yamada et al. | |
| 2021/0015162 A1 | 1/2021 | Moloney et al. | |
| 2021/0022404 A1 | 1/2021 | Moloney et al. | |
| 2022/0087323 A1 | 3/2022 | Moloney et al. | |
| 2022/0264943 A1 | 8/2022 | Lee et al. | |
| 2022/0330606 A1 | 10/2022 | Lee et al. | |
| 2023/0014608 A1 | 1/2023 | Jeong et al. | |
| 2023/0172282 A1 | 6/2023 | Cho et al. | |
| 2023/0346018 A1* | 11/2023 | Moloney | A24F 40/465 |
| 2023/0354888 A1 | 11/2023 | Holtz et al. | |

FOREIGN PATENT DOCUMENTS

| | | | |
|---|---|---|---|
| CN | 212590292 U | * | 2/2021 |
| CN | 112867405 A | | 5/2021 |
| CN | 112955038 A | | 6/2021 |
| CN | 113347897 A | | 9/2021 |
| EP | 3 831 223 A1 | | 6/2021 |
| KR | 10-1999-0014002 A | | 2/1999 |
| KR | 10-2018-0124739 A | | 11/2018 |
| KR | 10-2020-0009378 A | | 1/2020 |
| KR | 10-2123900 B1 | | 6/2020 |
| KR | 10-2020-0098679 A | | 8/2020 |
| KR | 10-2020-0099855 A | | 8/2020 |
| KR | 10-2020-0101337 A | | 8/2020 |
| KR | 10-2020-0126410 A | | 11/2020 |
| KR | 10-2020-0127892 A | | 11/2020 |
| KR | 10-2020-0129712 A | | 11/2020 |
| KR | 10-2020-0144049 A | | 12/2020 |
| KR | 10-2021-0026092 A | | 3/2021 |
| KR | 10-2021-0036716 A | | 4/2021 |
| KR | 10-2021-0042747 A | | 4/2021 |
| WO | 2020152289 A1 | | 7/2020 |
| WO | 2021/060768 A1 | | 4/2021 |

OTHER PUBLICATIONS

Communication dated Sep. 2, 2023 issued by the Korean Patent Office in application No. 10-2021-0091688.
Communication dated Oct. 10, 2023 issued by the European Patent Office in application No. 22790190.7.
International Search Report for PCT/KR2022/008769 dated Sep. 22, 2022.
Communication dated Mar. 26, 2025 issued by the State Intellectual Property Office of the P.R. China in application No. 202280003547. X.

* cited by examiner

AEROSOL GENERATING DEVICE

CROSS REFERENCE TO RELATED APPLICATIONS

This application is a National Stage of International Application No. PCT/KR2022/008769 filed Jun. 21, 2022, claiming priority based on Korean Patent Application No. 10-2021-0091688 filed Jul. 13, 2021.

TECHNICAL FIELD

Embodiments relate to an aerosol-generating device, and more particularly, to an aerosol-generating device capable of controlling the operation of a heater, based on information on aerosol-generating articles obtained through a transducer.

BACKGROUND ART

Demands for aerosol-generating devices, which generate aerosol in a non-burning scheme which substitutes a scheme of generating aerosol by burning cigarettes, are on the increase. The aerosol-generating device is a device which performs the function of generating aerosol from aerosol-generating materials in a non-burning scheme and supplying the generated aerosol to a user, or generating aerosol flavors by allowing steam generated from aerosol-generating materials to pass through a flavor medium.

In an embodiment of an aerosol-generating device, an aerosol-generating device capable of accommodating a replaceable aerosol-generating article and generating aerosol from the accommodated aerosol-generating article may be included.

DESCRIPTION OF EMBODIMENTS

Technical Problem

In order to increase user convenience, an aerosol-generating device may need to obtain information on an aerosol-generating article, such as the type of the aerosol-generating article or the amount of aerosol generated, and control the operation of the heater differently, based on the obtained information.

For example, since the amount and type of the aerosol-generating materials contained in the aerosol-generating article may be changed according to the type of the aerosol-generating article, the aerosol-generating device may need to control the heater differently according to the type of the aerosol-generating article. As another example, the aerosol-generating device may need to control the heating operation of the heater differently according to the amount of aerosol generated from the aerosol-generating article.

However, when a plurality of sensors are included in the aerosol-generating device in order to obtain information on the aerosol-generating article, such as the type of the aerosol-generating article or the amount of aerosol, restrictions, which need to be considered at the time of design in order to allow each sensor to appropriately perform functions, may increase.

As such, an aerosol-generating device capable of obtaining comprehensive information on the aerosol-generating article without a plurality of sensors may be required.

The embodiments provide an aerosol-generating device capable of obtaining information on an aerosol-generating article by utilizing a transducer and controlling the operation of a heater based on the obtained information.

The technical problems of the present disclosure are not limited to the above-described description, and other technical problems may be clearly understood by one of ordinary skill in the art from the embodiments to be described hereinafter.

Solution to Problem

An aerosol-generating device according to an embodiment may include an accommodation space where an aerosol-generating article is accommodated, a heater configured to generate aerosol by heating the aerosol-generating article, a transducer configured to output ultrasonic waves toward the accommodation space, receive ultrasonic waves reflected from the accommodation space, and generate electric signals corresponding to the received ultrasonic waves, and a processor configured to determine a type of the aerosol-generating article accommodated in the accommodation space based on the electric signals generated by the transducer, and control an operation of the heater based on the determined type of the aerosol-generating article.

Advantageous Effects of Disclosure

The aerosol-generating device according to embodiments may control the operation of the heater, based on information on the aerosol-generating article, which is obtained through a transducer.

As such, the aerosol-generating device may control the heater according to the type or state of the accommodated aerosol-generating article, and provide aerosol having excellent flavors to a user.

Effects of the present disclosure are not limited to the above effects, and effects that are not mentioned could be clearly understood by one of ordinary skill in the art from the present specification and the attached drawings.

MODE OF DISCLOSURE

Regarding the terms in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, terms which can be arbitrarily selected by the applicant in particular cases. In such a case, the meaning of the terms will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

In addition, throughout the specification, the "longitudinal direction" of a component may be a direction in which the component extends in one axis direction of the component, in which case, the one axis direction of the component may refer to a direction in which the component extends more than in the other axis direction intersecting with the one axis direction.

As used herein, when an expression such as "at least any one" precedes arranged elements, it modifies all elements rather than each arranged element. For example, the expression "at least any one of a, b, and c" should be construed to include a, b, c, or a and b, a and c, b and c, or a, b, and c.

The term 'embodiment' is an arbitrary division for easily describing the invention in the specification, and each of the embodiments is not necessarily mutually exclusive. For example, configurations disclosed in one embodiment may be applied and implemented in other embodiments, and in this case, changes of the configurations may be applied and implemented without departing from the scope of the specification.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

Figure 1:
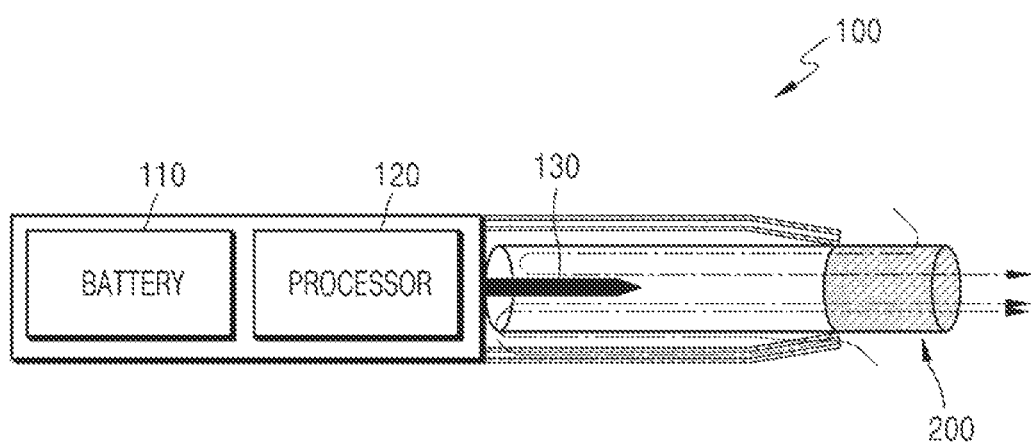
FIGS. 1 to 3 are diagrams showing examples in which an aerosol-generating article is inserted into an aerosol-generating device.
Figure 2:
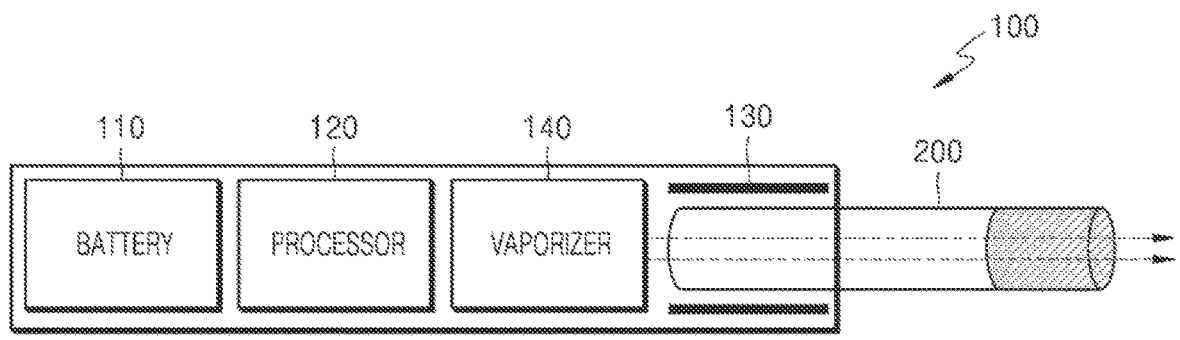
Figure 3:
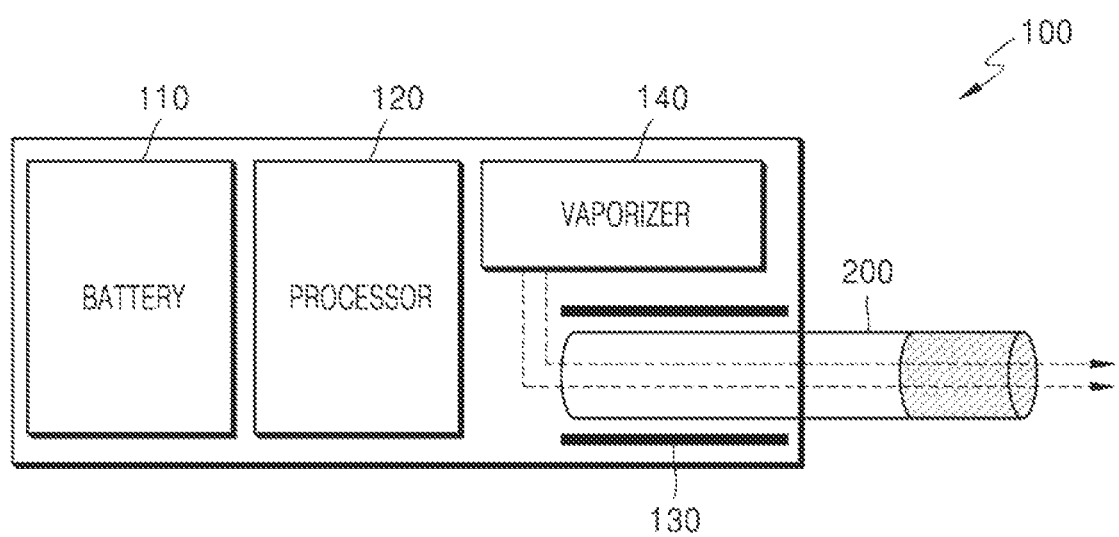

FIGS. 1 through 3 are diagrams showing examples in which a cigarette is inserted into an aerosol generating device.

Referring to FIG. 1, the aerosol generating device 100 may include a battery 110, a controller 120, and a heater 130.

Referring to FIGS. 2 and 3, the aerosol generating device 100 may further include a vaporizer 140. Also, the aerosol generating material 200 may be inserted into an inner space of the aerosol generating device 100.

FIGS. 1 through 3 illustrate components of the aerosol generating device 100, which are related to the present embodiment. Therefore, it will be understood by one of ordinary skill in the art related to the present embodiment that other general-purpose components may be further included in the aerosol generating device 100, in addition to the components illustrated in FIGS. 1 through 3.

Also, FIGS. 2 and 3 illustrate that the aerosol generating device 100 includes the heater 130. However, according to necessity, the heater 130 may be omitted.

FIG. 1 illustrates that the battery 110, the processor 120, and the heater 1300 are arranged in series. Also, FIG. 2 illustrates that the battery 110, the processor 120 the vaporizer 140, and the heater 130 are arranged in series. Also, FIG. 3 illustrates that the vaporizer 140 and the heater 130 are arranged in parallel. However, the internal structure of the aerosol generating device 100 is not limited to the structures illustrated in FIGS. 1 through 3. In other words, according to the design of the aerosol generating device 100, the battery 110, the processor 120, the heater 130, and the vaporizer 140 may be differently arranged.

When the aerosol generating material 200 is inserted into the aerosol generating device 100, the aerosol generating device 100 may operate the heater 130 and/or the vaporizer 140 to generate an aerosol from the aerosol generating material 200 and/or the vaporizer 140. The aerosol generated by the heater 130 and/or the vaporizer 140 is delivered to a user by passing through the aerosol generating material 200.

According to necessity, even when the aerosol generating material 200 is not inserted into the aerosol generating device 100, the aerosol generating device 100 may heat the heater 130.

The battery 110 may supply power to be used for the aerosol generating device 100 to operate. For example, the battery 110 may supply power to heat the heater 130 or the vaporizer 140, and may supply power for operating the processor 120. Also, the battery 110 may supply power for operations of a display, a sensor, a motor, etc. mounted in the aerosol generating device 100.

The processor 120 may generally control operations of the aerosol generating device 100. In detail, the processor 120 may control not only operations of the battery 110, the heater 130, and the vaporizer 140, but also operations of other components included in the aerosol generating device 100. Also, the processor 120 may check a state of each of the components of the aerosol generating device 100 to determine whether or not the aerosol generating device 100 is able to operate.

The processor 120 may include at least one processor. The processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 130 may be heated by the power supplied from the battery 110. For example, when the aerosol generating material 200 is inserted into the aerosol generating device 100, the heater 130 may be located outside the aerosol generating material 200. Thus, the heated heater 130 may increase a temperature of an aerosol generating material in the aerosol generating material 200.

The heater 130 may include an electro-resistive heater. For example, the heater 130 may include an electrically conductive track, and the heater 130 may be heated when currents flow through the electrically conductive track. However, the heater 130 is not limited to the example described above and may include all heaters which may be heated to a desired temperature. Here, the desired temperature may be pre-set in the aerosol generating device 100 or may be set as a temperature desired by a user.

As another example, the heater 130 may include an induction heater. In detail, the heater 130 may include an electrically conductive coil for heating a cigarette in an induction heating method, and the cigarette may include a susceptor which may be heated by the induction heater.

For example, the heater 130 may include a tube-type heating element, a plate-type heating element, a needle-type heating element, or a rod-type heating element, and may heat the inside or the outside of the aerosol generating material 200, according to the shape of the heating element.

Also, the aerosol generating device 100 may include a plurality of heaters 130. Here, the plurality of heaters 130 may be inserted into the aerosol generating material 200 or may be arranged outside the aerosol generating material 200. Also, some of the plurality of heaters 130 may be inserted into the aerosol generating material 200 and the others may be arranged outside the aerosol generating material 200. In addition, the shape of the heater 130 is not limited to the shapes illustrated in FIGS. 1 through 3 and may include various shapes.

The vaporizer 140 may generate an aerosol by heating a liquid composition and the generated aerosol may pass through the aerosol generating material 200 to be delivered to a user. In other words, the aerosol generated via the vaporizer 140 may move along an air flow passage of the aerosol generating device 100 and the air flow passage may be configured such that the aerosol generated via the vaporizer 140 passes through the aerosol generating material 200 to be delivered to the user.

For example, the vaporizer 140 may include a liquid storage, a liquid delivery element, and a heating element, but it is not limited thereto. For example, the liquid storage, the liquid delivery element, and the heating element may be included in the aerosol generating device 100 as independent modules.

The liquid storage may store a liquid composition. For example, the liquid composition may be a liquid including a tobacco-containing material having a volatile tobacco flavor component, or a liquid including a non-tobacco material. The liquid storage may be formed to be attached/detached to/from the vaporizer 140 or may be formed integrally with the vaporizer 140.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 140 may be referred to as a cartomizer or an atomizer, but it is not limited thereto.

The aerosol generating device 100 may further include general-purpose components in addition to the battery 110, the processor 120, the heater 130, and the vaporizer 140. For example, the aerosol generating device 100 may include a display capable of outputting visual information and/or a motor for outputting haptic information. Also, the aerosol generating device 100 may include at least one sensor (a puff detecting sensor, a temperature detecting sensor, a cigarette insertion detecting sensor, etc.). Also, the aerosol generating device 100 may be formed as a structure where, even when the aerosol generating material 200 is inserted into the aerosol generating device 100, external air may be introduced or internal air may be discharged.

Although not illustrated in FIGS. 1 through 3, the aerosol generating device 100 and an additional cradle may form together a system. For example, the cradle may be used to charge the battery 110 of the aerosol generating device 100. Alternatively, the heater 130 may be heated when the cradle and the aerosol generating device 100 are coupled to each other.

The aerosol generating material 200 may be similar as a general combustive cigarette. For example, the aerosol generating material 200 may be divided into a first portion including an aerosol generating material and a second portion including a filter, etc. Alternatively, the second portion of the aerosol generating material 200 may also include an aerosol generating material. For example, an aerosol generating material made in the form of granules or capsules may be inserted into the second portion.

The entire first portion may be inserted into the aerosol generating device 100, and the second portion may be exposed to the outside. Alternatively, only a portion of the first portion may be inserted into the aerosol generating device 100, or the entire first portion and a portion of the second portion may be inserted into the aerosol generating device 100. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 100. For example, the opening and closing and/or a size of the air passage formed in the aerosol generating device 100 may be adjusted by the user. Accordingly, the amount of smoke and a smoking impression may be adjusted by the user. As another example, the external air may flow into the aerosol generating material 200 through at least one hole formed in a surface of the aerosol generating material 200.

Hereinafter, an example of the aerosol generating material 200 will be described with reference to FIG. 4.

Figure 4:
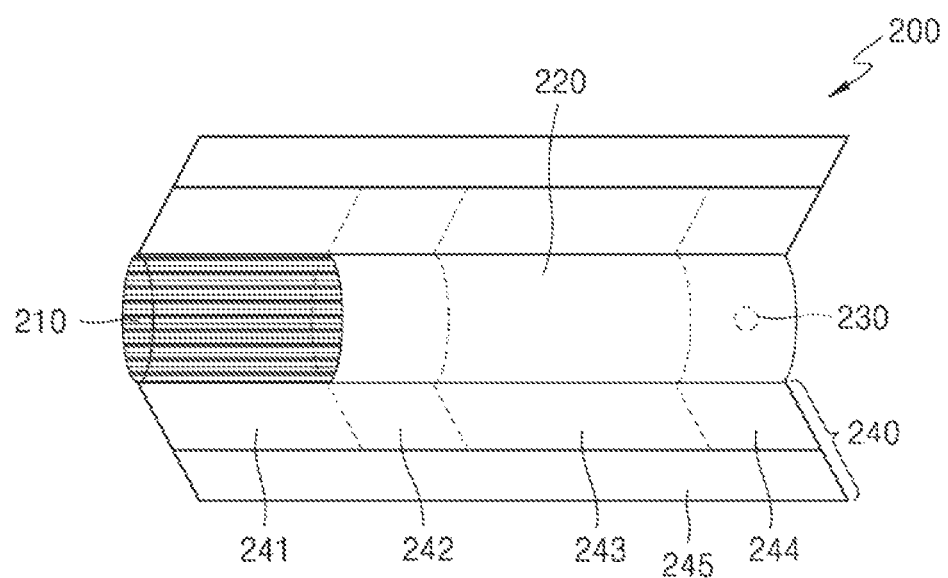
FIG. 4 is a diagram illustrating examples of an aerosol-generating article.

FIG. 4 illustrates an example of an aerosol generating material.

Referring to FIG. 4, the aerosol generating material 200 may include a tobacco rod 210 and a filter rod 220. The first portion described above with reference to FIGS. 1 through 3 may include the tobacco rod 210, and the second portion may include the filter rod 220.

FIG. 4 illustrates that the filter rod 220 includes a single segment. However, the filter rod 220 is not limited thereto. In other words, the filter rod 220 may include a plurality of segments. For example, the filter rod 220 may include a first segment configured to cool an aerosol and a second segment configured to filter a certain component included in the aerosol. Also, according to necessity, the filter rod 220 may further include at least one segment configured to perform other functions.

The aerosol generating material 200 may be packaged via at least one wrapper 240. The wrapper 240 may have at least one hole through which external air may be introduced or internal air may be discharged. For example, the aerosol generating material 200 may be packaged via one wrapper 240. As another example, the aerosol generating material 200 may be doubly packaged via at least two wrappers 240. For example, the tobacco rod 210 may be packaged via a first wrapper 241, and the filter rod 220 may be packaged via wrappers 242, 243 and 243. And, the entire aerosol generating material 200 may be packaged via separate wrappers 245. When each of the tobacco rod 210 and the filter rod 220 includes a plurality of segments, each segment may be packaged via wrappers 242, 243 and 244.

The tobacco rod 210 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 210 may include other additives, such as flavors, a wetting agent, and/or organic acid. Also, the tobacco rod 210 may include a flavored liquid, such as menthol or a moisturizer, which is injected to the tobacco rod 210.

The tobacco rod 210 may be manufactured in various forms. For example, the tobacco rod 210 may be formed as a sheet or a strand. Also, the tobacco rod 210 may be formed as a pipe tobacco, which is formed of tiny bits cut from a tobacco sheet. Also, the tobacco rod 210 may be surrounded by a heat conductive material. For example, the heat-conducting material may be, but is not limited to, a metal foil such as aluminum foil. For example, the heat conductive material surrounding the tobacco rod 210 may uniformly distribute heat transmitted to the tobacco rod 210, and thus, the heat conductivity applied to the tobacco rod may be increased and taste of the tobacco may be improved. Also, the heat conductive material surrounding the tobacco rod 210 may function as a susceptor heated by the induction heater. Here, although not illustrated in the drawings, the tobacco rod 210 may further include an additional susceptor, in addition to the heat conductive material surrounding the tobacco rod 210.

The filter rod 220 may include a cellulose acetate filter. Shapes of the filter rod 220 are not limited. For example, the filter rod 220 may include a cylinder-type rod or a tube-type rod having a hollow inside. Also, the filter rod 220 may include a recess-type rod. When the filter rod 220 includes a plurality of segments, at least one of the plurality of segments may have a different shape.

The filter rod 220 may be formed to generate flavors. For example, a flavoring liquid may be injected onto the filter rod 220, or an additional fiber coated with a flavoring liquid may be inserted into the filter rod 220.

Also, the filter rod 220 may include at least one capsule 230. Here, the capsule 230 may generate a flavor or an aerosol. For example, the capsule 230 may have a configuration in which a liquid containing a flavoring material is wrapped with a film. For example, the capsule 230 may have a spherical or cylindrical shape, but is not limited thereto.

When the filter rod 220 includes a segment configured to cool the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above-described example and is not limited as long as the cooling segment cools the aerosol.

Figure 5:
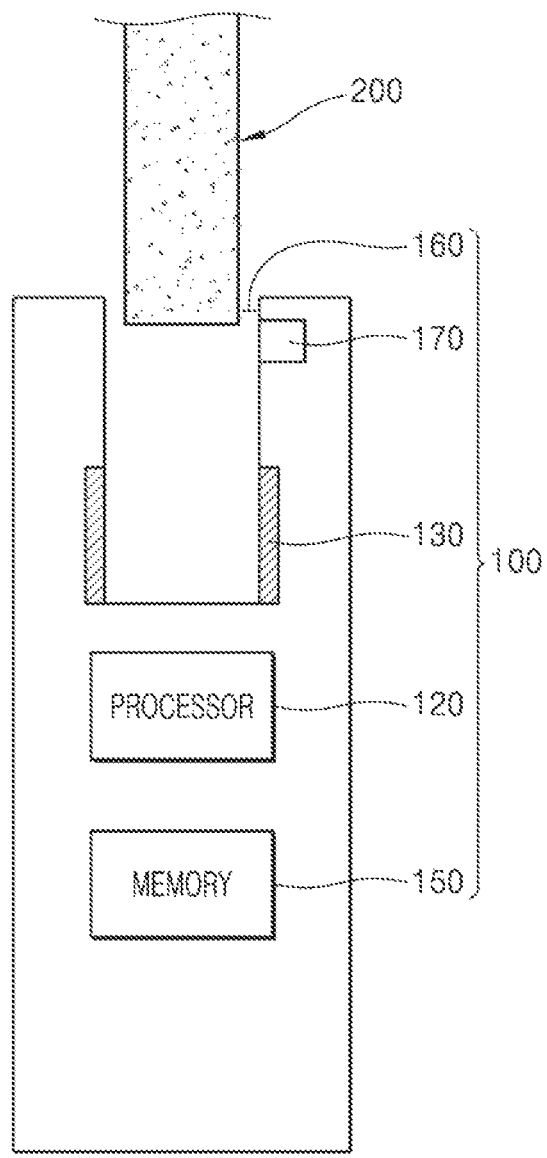
FIG. 5 is a view illustrating an aerosol-generating device according to an embodiment.

FIG. 5 is a view illustrating an aerosol-generating device according to an embodiment.

Referring to FIG. 5, an aerosol-generating device 100 according to an embodiment may include a processor 120, a heater 130, a memory 150, an accommodation space 160, and a transducer 170. Since the processor 120 and the heater 130 of FIG. 5 may be substantially and respectively the same as the processor 120 and the heater 130 of FIGS. 1 to 3, descriptions that are the same as those given above are omitted. In addition, since an aerosol-generating article 200 of FIG. 5 may be substantially the same as the aerosol-generating article 200 of FIGS. 1 to 4, descriptions that are the same as those given above are omitted.

The memory 150 is hardware for storing various pieces of data processed by the aerosol-generating device 100, and may store data processed by the processor 120 and data to be processed by the processor 120. For example, the memory 150 may store the operating times of the aerosol-generating device 100, the maximum number of puffs, the current number of puffs, at least one temperature profile, and data regarding a user's smoking pattern.

For example, the memory 150 may be implemented with various types of memories, such as random access memory (RAM) such as dynamic random access memory (DRAM) and static random access memory (SRAM), read-only memory (ROM), and electrically erasable programmable read-only memory (EEPROM).

The accommodation space 160 may be a space where the aerosol-generating article 200 is removably accommodated. For example, the user may insert the aerosol-generating article 200 into the accommodation space 160 in order to inhale aerosol, and may remove the aerosol-generating article 200 from the accommodation space 160 after the inhaling of the aerosol is completed. In addition, the statement that the aerosol-generating device 100 includes an accommodation space 160 may mean that the aerosol-generating device 100 includes at least one housing or structure where the accommodation space 160 is formed.

The heater 130 may be arranged to surround at least a portion of the accommodation space 160. As such, when the aerosol-generating article 200 is accommodated in the accommodation space 160, the heater 130 may surround the external side of the aerosol-generating article 200. In addition, it is illustrated in FIG. 5 that the heater 130 surrounds the external side of the aerosol-generating article 200, but is not limited thereto, and the heater 130 may have a shape where at least a portion is inserted into the aerosol-generating article 200.

The transducer 170 may output ultrasonic waves toward the accommodation space 160 and receive the ultrasonic waves reflected from the accommodation space 160 to thereby generate electric signals corresponding to the received ultrasonic waves.

As an example, the transducer 170 may include a piezoelectric element. The piezoelectric element may be a material which may generate physical vibrations when power is applied thereto, and may convert physical vibrations into electrical signals when physical vibrations are applied thereto. As such, when power of the battery (e.g., the battery 110 of FIGS. 1 to 4) is applied to the transducer 170, ultrasonic waves may be generated by piezoelectric elements. The ultrasonic waves generated from the transducer 170 may propagate toward the accommodation space 160, and may be reflected on the inner wall of the accommodation space 160 or an object accommodated in the accommodation space 160 to thereby be received by the transducer 170 again. The piezoelectric element may generate an electric signal by vibration by ultrasonic waves received by the transducer 170.

For example, the transducer 170 may output ultrasonic waves to the accommodation space 160 and may, at the same time, generate ultrasonic waves reflected from the accommodation space 160 to thereby generate electric signals, but is not limited thereto. As another example, the transducer 170 may generate electric signals by receiving ultrasonic waves reflected from the accommodation space 160 when the output of ultrasonic waves is stopped during a predetermined time.

The transducer 170 may be arranged to be spaced apart from the heater 130 in the longitudinal direction of the aerosol-generating device 100. As such, as the influence of heat, which is generated by the heater 130, on the transducer 170 decreases, the transducer 170 may smoothly receive ultrasonic waves reflected from the accommodation space 160 even during the operation of the heater 130.

The transducer 170 may be arranged to be adjacent to the accommodation space 160 to output ultrasonic waves to the accommodation space 160 and smoothly receive ultrasonic waves reflected from the accommodation space 160. For example, when the aerosol-generating article 200 is accommodated in the accommodation space 160, the transducer 170 may directly contact the external surface of the aerosol-generating article 200 or may be disposed to be adjacent to the external surface of the aerosol-generating article 200 and be slightly spaced apart from the external surface of the aerosol-generating article 200.

The processor 120 may determine whether the aerosol-generating article 200 has been accommodated in the accommodation space 160, based on electric signals generated by the transducer 170. In addition, when it is determined that the aerosol-generating article 200 has been accommodated in the accommodation space 160, the processor 120 may start the operation of the heater 130 without a user's separate control.

As an example, if the aerosol-generating article 200 is accommodated in the accommodation space 160 while the transducer 170 outputs ultrasonic waves to the accommodation space 160, the intensity of electric signals generated by the transducer 170 may be changed. As such, the processor 120 may determine whether the aerosol-generating article 200 has been accommodated in the accommodation space 160, based on the change value of the intensity of electric signals generated by the transducer 170.

As another example, the processor 120 may determine whether the aerosol-generating article 200 has been accommodated in the accommodation space 160 by comparing at least one of the intensity, pattern, and characteristics of electric signals, which are generated by the transducer 170, with at least one of the intensity, pattern, and characteristics of electric signals stored in the memory 150.

Figure 6:
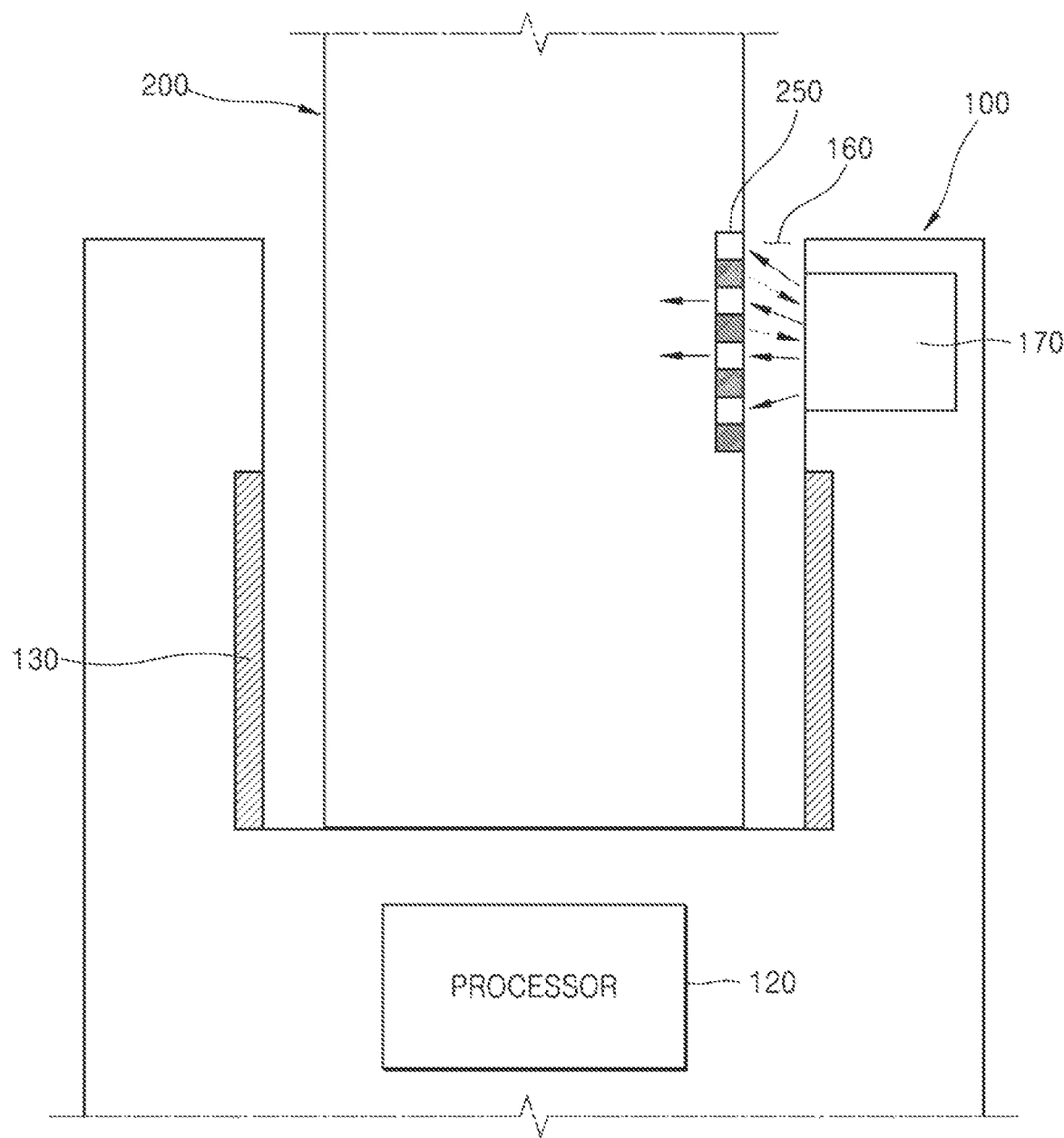
FIG. 6 is a diagram for explaining a method of determining the type of an aerosol-generating article by an aerosol-generating device, according to an embodiment.

FIG. 6 is a diagram for explaining a method of determining the type of an aerosol-generating article by an aerosol-generating device, according to an embodiment. Since the processor 120, the heater 130, the accommodation space 160, and the transducer 170 of FIG. 6 may be substantially and respectively the same as the processor 120, the heater 130, the accommodation space 160, and the transducer 170 of FIG. 5, descriptions that are the same as those given above are omitted.

Furthermore, in an example, the type of the aerosol-generating article 200 may be distinguished according to the amount and type of the aerosol-generating materials contained therein. Since an appropriate heating temperature or heating time may be different depending on the amount or type of the aerosol-generating materials, the aerosol-generating article 200 may be differently heated depending on the type of the aerosol-generating article 200.

In an embodiment, the processor 120 may determine the type of the aerosol-generating article 200 accommodated in the accommodation space 160, based on electric signals generated by the transducer 170, and may control the operation of the heater 130, based on the determined type of the aerosol-generating article 200. For example, when the aerosol-generating article 200 is accommodated in the accommodation space 160, the transducer 170 may output ultrasonic waves toward the accommodation space 160 and may generate electric signals from ultrasonic waves reflected from the aerosol-generating article 200. The processor 120 may determine the type of the aerosol-generating article 200, which has been accommodated in the accommodation space 160, by comparing at least one of the intensity, pattern, and characteristics of electric signals, which are generated by the transducer 170, with at least one of the intensity, pattern, and characteristics of electric signals stored in a memory (e.g., the memory 150 of FIG. 5).

The ratio of the ultrasonic waves reflected from the external surface of the aerosol-generating article 200 among ultrasonic waves, which are output toward the accommodation space 160, may be determined by the material or shape of the external surface of the aerosol-generating article 200. When the material or shape of the external surface of the aerosol-generating article 200 is different depending on the type of the aerosol-generating article 200, the aerosol-generating device 100 may easily determine the type of the aerosol-generating article 200 by utilizing the transducer 170.

The aerosol-generating article 200, which is accommodated in the aerosol-generating device 100, according to an embodiment, may include an identifier 250. For example, the intensity of electric signals, which are generated by the transducer 170, may vary depending on the type of the aerosol-generating article 200 because the identifier 250 may be manufactured to have a different material or shape depending on the type of the aerosol-generating article 200. As such, the processor 120 may easily determine the type of the aerosol-generating article 200, based on the intensity of electric signals, which are generated by the transducer 170.

The identifier 250 may be manufactured of a material which is different from that of a wrapper (e.g., a wrapper 240 of FIG. 4) which forms the external surface of the aerosol-generating article 200. For example, the material of the identifier 250 may include a metallic material, poly lactic acid (PLA) which is a non-metallic material, and plastic, but is not limited thereto.

In an embodiment, the processor 120 may control the heater 130 to perform the heating operation according to the temperature profile corresponding to the determined type of the aerosol-generating article 200, among a plurality of pre-set temperature profiles. Here, the temperature profile may mean the temperature change of the heater 130 or the aerosol-generating article 200 according to the time or the number of puffs during one smoking operation using the aerosol-generating article 200. For example, a plurality of temperature profiles corresponding to the type of each aerosol-generating article 200 may be stored in a memory (e.g., the memory 150 of FIG. 5) in advance. As such, the processor 120 may determine the type of the aerosol-generating article 200 and control the heater 130 to perform the heating operation according to the temperature profile corresponding to the determined type of the aerosol-generating article 200, among a plurality of temperature profiles stored in the memory.

In an embodiment, the processor 120 compares the determined type of the aerosol-generating article 200 with the type pre-stored in the aerosol-generating device 100, and if the determined type of the aerosol-generating article 200 is different from the pre-stored type of the aerosol-generating device 100, the processor 120 may control the heater 130 not to perform the heating operation. For example, when the type of the aerosol-generating article 200 accommodated in the accommodation space 160 is different from the type stored in the memory (e.g., the memory 150 of FIG. 5), the processor 120 may control the heater 130 not to perform the heating operation.

Figure 7:
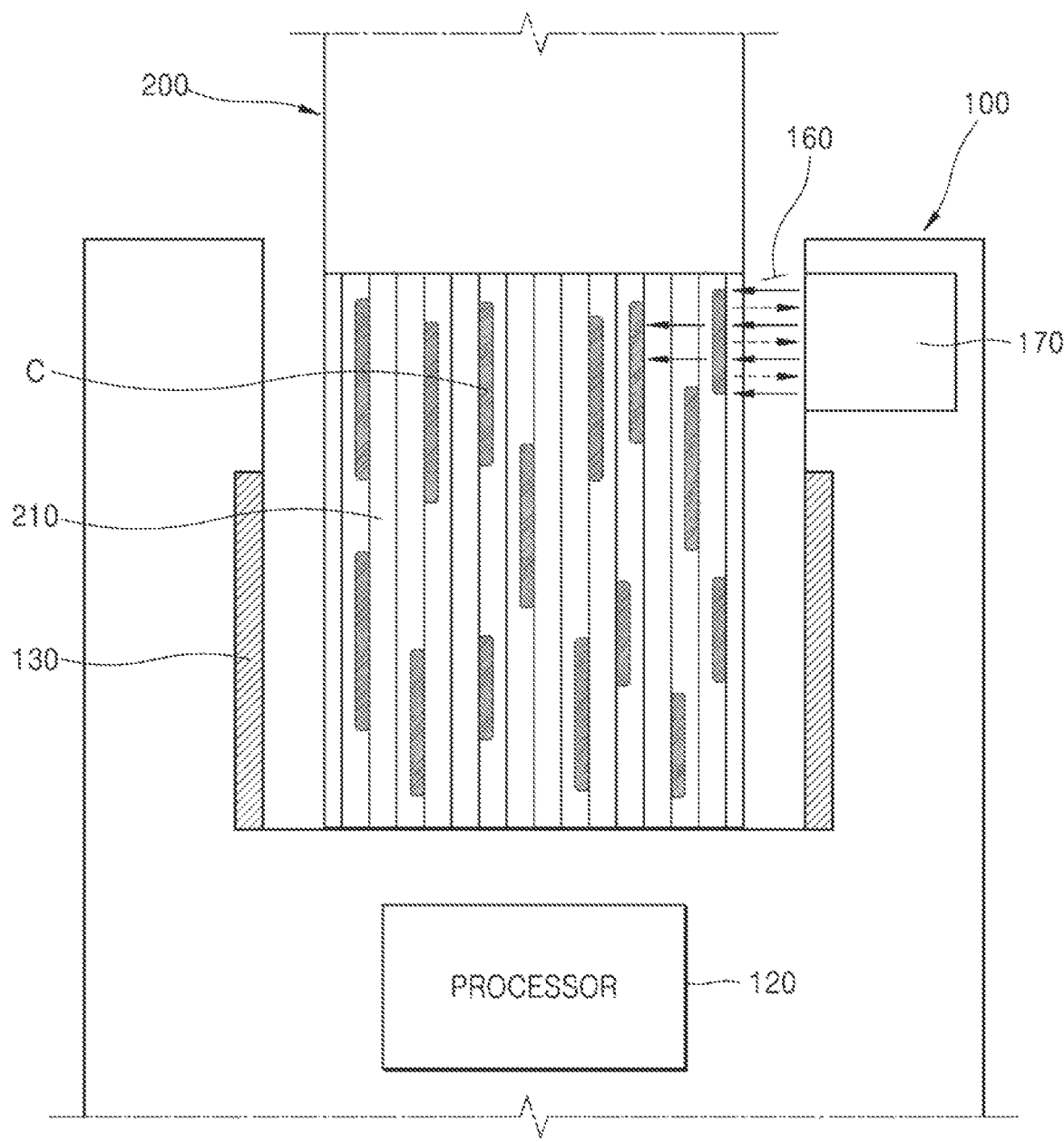
FIG. 7 is a diagram for explaining a method of determining whether to reuse an aerosol-generating article by an aerosol-generating device, according to an embodiment.

FIG. 7 is a diagram for explaining a method of determining whether to reuse an aerosol-generating article by an aerosol-generating device, according to an embodiment. Since the processor 120, the heater 130, the accommodation space 160, and the transducer 170 of FIG. 7 may be substantially and respectively the same as the processor 120, the heater 130, the accommodation space 160, and the transducer 170 of FIG. 5, descriptions that are the same as those given above are omitted.

For example, aerosol-generating materials in the aerosol-generating article 200 may be consumed as the aerosol-generating device 100 performs the smoking operation using the aerosol-generating article 200. In this case, the used aerosol-generating article 200 should be discarded by the user. When the user reuses the already used aerosol-generating article 200, at least a portion of the aerosol-generating materials has already been consumed, and thus the user may not be able to sufficiently feel satisfaction from the reused aerosol-generating article 200. As such, when the aerosol-generating article 200 accommodated in the accommodation space 160 is a reused one, the aerosol-generating device 100 may control the heater 130 not to perform the heating operation.

In an embodiment, the processor 120 may determine whether the aerosol-generating article 200 has been reused, based on electrical signals generated by the transducer 170, and if it is determined that the aerosol-generating article 200 has been reused, the processor 120 may control the heater 130 not to perform the heating operation.

For example, the aerosol-generating article 200, which has been used at least once, may contain carbides C which are obtained by transformation of the aerosol-generating material of a tobacco rod 210 by heat of the heater 130. Since the degree of reflection of ultrasonic waves varies depending on the material, the degree of reflection of ultrasonic waves from the aerosol-generating article 200 may vary depending on whether carbides C are contained in the aerosol-generating article 200. As such, when a case where carbides C are contained in the aerosol-generating article 200 is compared with a case where carbides C are not contained in the aerosol-generating article 200, at least one of the intensity, pattern, and characteristics of electric signals, which are generated by the transducer 170, may be different from another. If at least one of the intensity, pattern, and characteristics of electric signals, which are generated by the transducer 170 is different from at least one of the intensity, pattern, and characteristics of electric signals stored in a memory (e.g., the memory 150 of FIG. 5), the processor 120 may determine that the aerosol-generating article 200, which is accommodated in the accommodation space 160, has been reused. In addition, if it is determined that the aerosol-generating article 200 has been reused, the processor 120 may control the heater 130 not to perform the heating operation.

Figure 8:
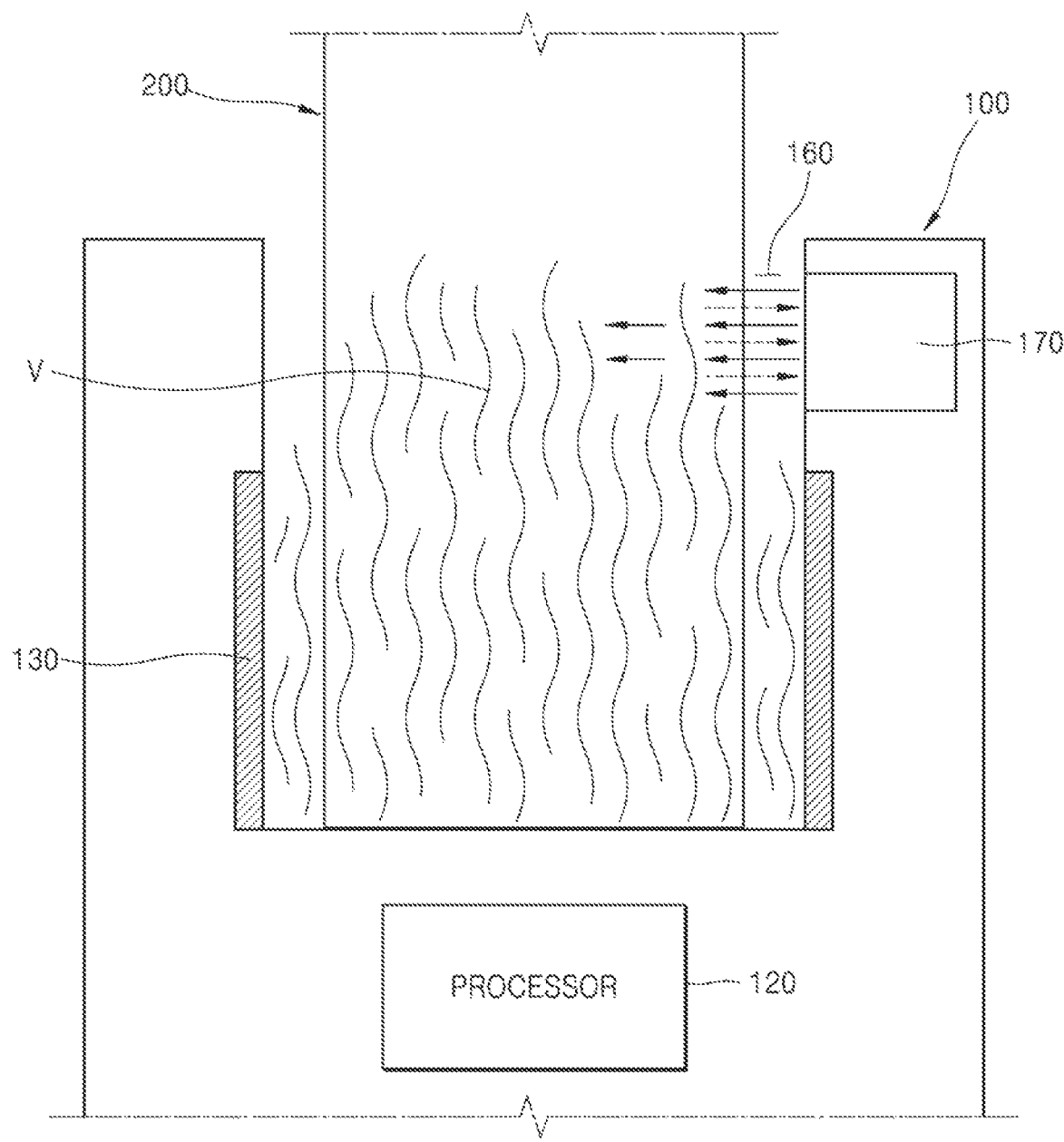
FIG. 8 is a diagram for explaining a method of determining the amount of aerosol generated in an accommodation space by an aerosol-generating device, according to an embodiment.

FIG. 8 is a diagram for explaining a method of determining the amount of aerosol generated in an accommodation space by an aerosol-generating device, according to an embodiment. Since the processor 120, the heater 130, the accommodation space 160, and the transducer 170 of FIG. 8 may be substantially and respectively the same as the processor 120, the heater 130, the accommodation space 160, and the transducer 170 of FIG. 5, descriptions that are the same as those given above are omitted.

For example, the state of the aerosol-generating article 200, which is accommodated in the accommodation space 160, may be abnormal as in the case that impurities are contained in the aerosol-generating article 200 or excessive moisture are included in the aerosol-generating article 200. In this case, since the amount of aerosol, which is generated from the aerosol-generating article 200, may be different from the amount in a normal case, the aerosol-generating device 100 may determine the amount of aerosol and control the operation of the heater 130.

In an embodiment, the processor 120 may determine the amount of aerosol generated in the accommodation space 160 based on electric signals generated by the transducer 170, and control the operation of the heater 130, based on the determined amount of aerosol.

If the heater 130 starts the heating operation, the aerosol V may be generated from the aerosol-generating article 200. The generated aerosol V may be located inside or outside the aerosol-generating article 200 before being inhaled by the user. The ultrasonic waves, which are output from the transducer 170, may be reflected from the aerosol V positioned outside or inside the aerosol-generating article 200. As the amount of aerosol V increases, the amount of the ultrasonic waves, which are reflected from the aerosol V to the transducer 170, may increase, and the intensity of electric signals generated by the transducer 170 may increase. As such, the processor 120 may determine the amount of aerosol generated in the accommodation space 160, based on the intensity of electric signals generated by the transducer 170.

In addition, for example, the heater 130 may preheat the aerosol-generating article 200 for a predetermined time before the user inhales aerosol. In this case, since the time when the aerosol-generating article 200 is preheated may be preferably short, the temperature of the heater 130 may be maintained higher in a period when the aerosol-generating article 200 is preheated than in a period when the user inhales aerosol.

In an embodiment, when the amount of aerosol, which is determined at the point in time when the pre-set time has passed after the heater 130 starts the heating operation, is less than a critical value, the processor 120 may stop the operation of the heater 130. In other words, the processor 120 determines the amount of aerosol generated from the aerosol-generating article 200 at a point in time when the preheating is completed, and if the determined amount of aerosol is less than a critical value, the processor 120 may determine that the aerosol-generating article 200 is in an abnormal state. As such, the processor 120 may stop the operation of the heater 130.

In addition, when the amount of aerosol, which is determined at the point in time when the pre-set time has passed after the heater 130 starts the heating operation, is less than a critical value, the aerosol-generating device 100 may provide the user with an alarm to remove the aerosol-generating article 200 from the accommodation space 160 through a user interface (not shown). The user interface may be at least one of a display capable of outputting visual information and a motor for outputting haptic information, but is not limited thereto.

In an embodiment, when the amount of aerosol, which is determined at the point in time when the pre-set time has passed after the heater 130 starts the heating operation, is equal to or greater than a critical value, the processor 120 may decrease the heating temperature of the heater 130. In other words, the processor 120 determines the amount of aerosol generated in the accommodation space 160 at a point in time when the preheating is completed, and if the determined amount of aerosol is equal to or greater than a critical value, the processor 120 may determine that the aerosol-generating article 200 is in a normal state. As such, the processor 120 may determine that the heating has been normally performed and decrease the heating temperature of the heater 130 according to the pre-set temperature profile. However, it is not limited thereto, and the heating temperature may increase after the completion of the preheating, depending on the pre-set temperature profile.

Figure 9:
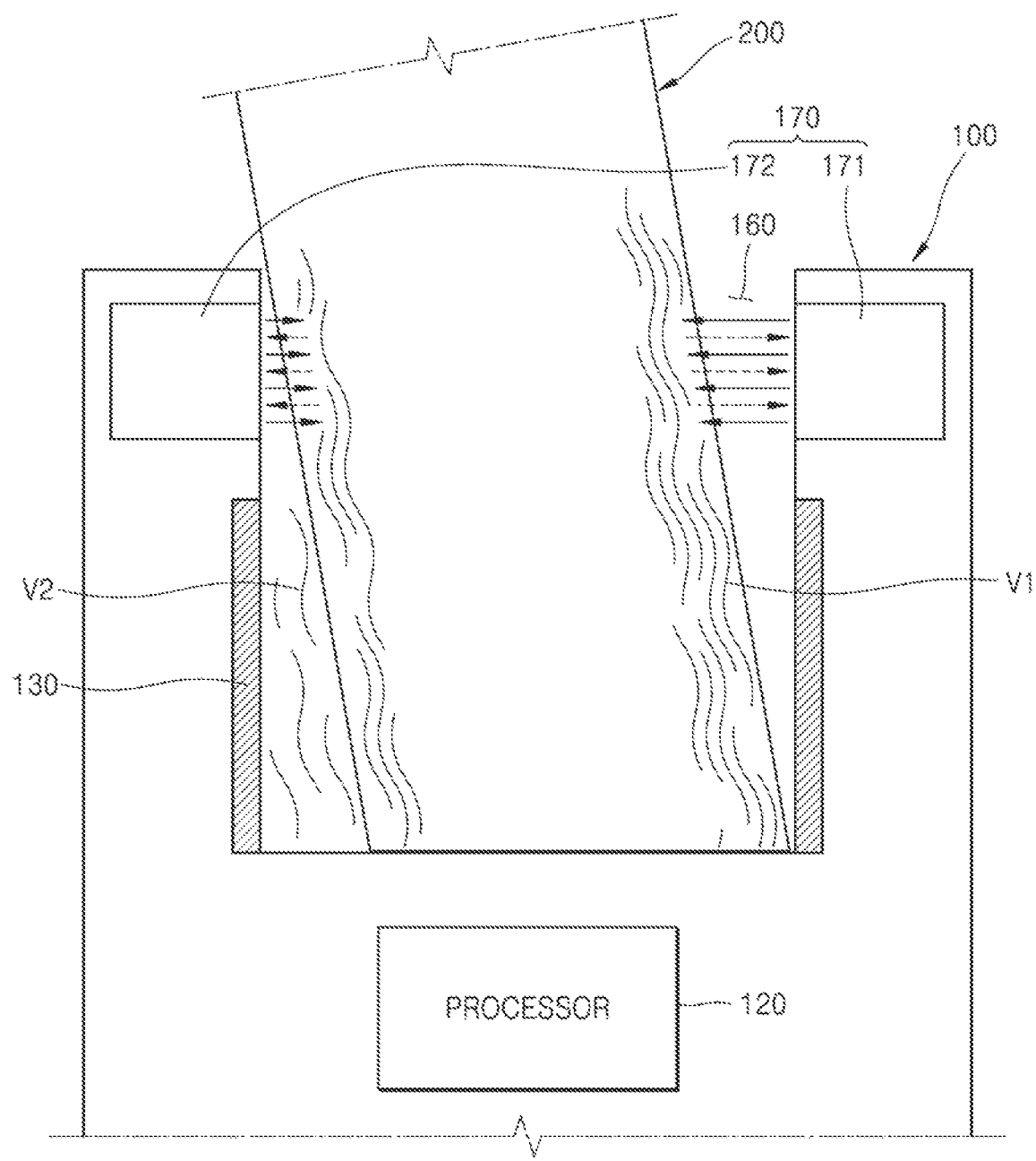
FIG. 9 is a diagram for explaining a method of determining whether the amount of aerosol generated in an accommodation space is uniform, by an aerosol-generating device, according to an embodiment.

FIG. 9 is a diagram for explaining a method of determining whether the amount of aerosol generated in an accommodation space is uniform, by an aerosol-generating device, according to an embodiment. Since the processor 120, the heater 130, and the accommodation space 160 of FIG. 9 may be substantially and respectively the same as the processor 120, the heater 130, and the accommodation space 160 of FIG. 5, descriptions that are the same as those given above are omitted.

For example, the aerosol-generating article 200 may be accommodated in the accommodation space 160 as in the case that the aerosol-generating article 200 is inserted into the accommodation space 160 in a direction which is not parallel to the longitudinal direction of the aerosol-generating device 100. In this case, since heat of the heater 130 is non-uniformly transferred to the aerosol-generating article 200, the aerosol-generating materials of one region of the aerosol-generating article 200 may be more quickly consumed than the aerosol-generating materials of another region, and thus, the user may not be able to feel smoking satisfaction.

In an embodiment, the transducer 170 may include a first transducer 171 for outputting ultrasonic waves in one region of the accommodation space 160, and a second transducer 172 for outputting ultrasonic waves in another region of the accommodation space 160. For example, the first transducer 171 and the second transducer 172 may be arranged in the accommodation space 160 to face directions opposite to each other, but are not limited thereto.

In an embodiment, the processor 120 may control the operation of the heater 130 by comparing the amount of aerosol generated in one region of the accommodation space 160, which is determined using the first transducer 171, with the amount of aerosol V2 generated in another region of the accommodation space 160 using the second transducer 172. For example, the processor 120 may determine the amount of aerosol V1 generated in one region of the accommodation space 160, based on the intensity of electric signals generated by the first transducer 171. In addition, the processor 120 may determine the amount of aerosol V2 generated in another region of the accommodation space 160, based on the intensity of electric signals generated by the second transducer 172. The processor 120 may determine whether aerosol V1 and V2 is uniformly generated in the accommodation space 160, depending on whether the difference between the amount of aerosol V1 generated in one region of the accommodation space 160 and the amount of aerosol V2 generated in another region of the accommodation space 160 is within an error range.

In an embodiment, the processor 120 may determine whether aerosol V1 and V2 is uniformly generated in the accommodation space 160, if the difference between the amount of aerosol V1 generated in one region of the accommodation space 160 and the amount of aerosol V2 generated in another region of the accommodation space 160 is outside an error range, and may stop the heating operation of the heater 130.

In addition, when it is determined that aerosol V1 and V2 is non-uniformly generated in the accommodation space 160, the aerosol-generating device 100 may provide an alarm to check the accommodation state of the aerosol-generating article, to the user through a user interface (not shown). The user interface may be at least one of a display capable of outputting visual information and a motor for outputting haptic information, but is not limited thereto.

Figure 10:
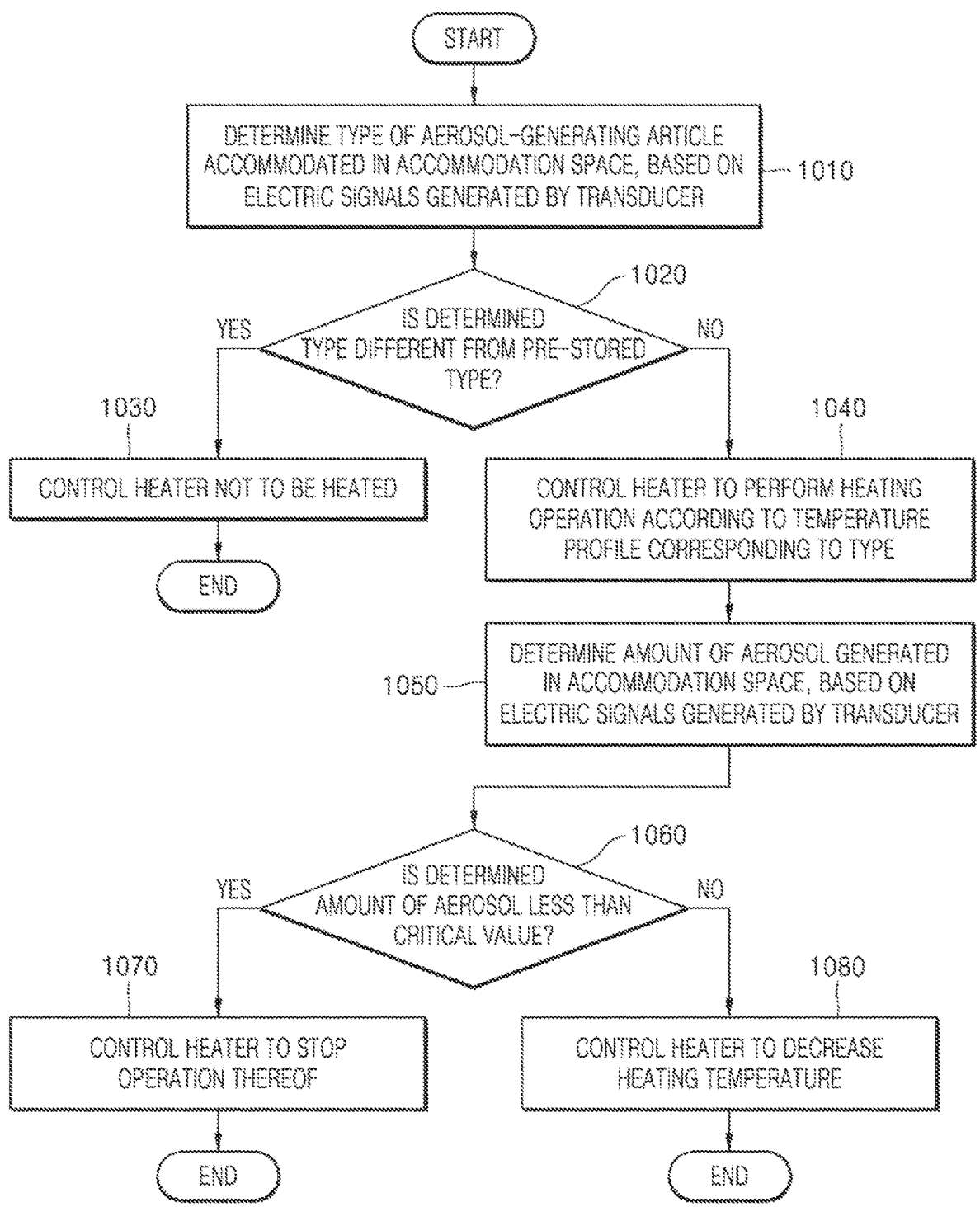
FIG. 10 is a flowchart illustrating an operating method of an aerosol-generating device according to an embodiment.

FIG. 10 is a flowchart illustrating an operating method of an aerosol-generating device according to an embodiment. The description about the operation of the aerosol-generating device of FIG. 10 is related to embodiments described with reference to FIGS. 1 to 9. Accordingly, even though omitted below, the descriptions of FIGS. 1 to 9 may also be applied to the method of FIG. 10.

In operation 1010, an aerosol-generating device may determine the type of an aerosol-generating article accommodated in an accommodation space, based on electric signals generated by a transducer. For example, the aerosol-generating device may determine the type of the aerosol-generating article accommodated in the accommodation space by comparing at least one of the intensity, pattern, and characteristics of electric signals, which are generated by the transducer, with at least one of the intensity, pattern, and characteristics of electric signals stored in the memory.

In operation 1020, the aerosol-generating device may determine whether the determined type of the aerosol-generating device is different from the type pre-stored in the aerosol-generating device.

In operation 1030, if the determined type of the aerosol-generating device is different from the type pre-stored in the aerosol-generating device, the aerosol-generating device may control the heater not to perform the heating operation. In addition, the aerosol-generating device may output an alarm to check the type of the aerosol-generating article through a user interface.

In operation 1040, if the determined type of the aerosol-generating device is not different from the type pre-stored in the aerosol-generating device, the aerosol-generating device may control the heater to perform the heating operation according to the temperature profile corresponding to the determined type of the aerosol-generating article. After completing determination on the type of the aerosol-generating article, the aerosol-generating device may perform the heating operation without a separate user input. However, it is not limited thereto, and the aerosol-generating device may perform the heating operation only if an additional user input is received after completing the determination on the type of the aerosol-generating article.

In operation 1050, the aerosol-generating device may determine the amount of aerosol generated in the accommodation space, based on electric signals generated by the transducer. For example, the aerosol-generating device may determine the amount of aerosol generated in the accommodation space at the point in time when the pre-set time has passed (that is, the point in time when preheating has been completed) after the heater starts the heating operation of preheating the aerosol-generating article.

In operation 1060, the aerosol-generating device may determine whether the determined amount of aerosol is less than a critical value.

In operation 1070, when the determined amount of aerosol is less than the critical value, the aerosol-generating device may determine that the aerosol-generating article is in an abnormal state and may control the heater to stop the operation. For example, cases, in which the aerosol-generating article is in an abnormal state, may include a case in which impurities are contained in the aerosol-generating article or a case in which excessive moisture is contained in the aerosol-generating article.

In operation 1080, if the determined amount of aerosol is equal to or greater than the critical value, the heater may be controlled to decrease the heating temperature of the heater. In other words, the aerosol-generating device determines the amount of aerosol generated in the accommodation space at a point in time when the preheating is completed, and if the determined amount of aerosol is equal to or greater than a critical value, the aerosol-generating device may determine that the aerosol-generating article is in a normal state. As such, the aerosol-generating device may determine that the heating has been normally performed and decrease the heating temperature of the heater according to the pre-set temperature profile.

As described above, the aerosol-generating device according to an embodiment may provide aerosol having excellent flavors to the user by obtaining comprehensive information on aerosol-generating articles by utilizing a transducer and controlling the operation of the heater based on the obtained information.

One embodiment may also be implemented in the form of a computer-readable recording medium including instructions executable by a computer, such as a program module executable by the computer. The computer-readable recording medium may be any available medium that can be accessed by a computer and includes both volatile and nonvolatile media, and removable and non-removable media. In addition, the computer-readable recording medium may include both a computer storage medium and a communication medium. The computer storage medium includes all of volatile and nonvolatile, and removable and non-removable media implemented by any method or technology for storage of information such as computer-readable instructions, data structures, program modules or other data. The communication medium typically includes computer-readable instructions, data structures, other data in modulated data signals such as program modules, or other transmission mechanisms, and includes any information transfer media.

Those of ordinary skill in the art related to the present embodiments may understand that various changes in form and details can be made therein without departing from the scope of the characteristics described above. The disclosed methods should be considered in descriptive sense only and not for purposes of limitation. The scope of the present disclosure is defined by the appended claims rather than by the foregoing description, and all differences within the scope of equivalents thereof should be construed as being included in the present disclosure.

The invention claimed is:

1. An aerosol-generating device comprising:
   an accommodation space where an aerosol-generating article is accommodated;
   a heater configured to generate aerosol by heating the aerosol-generating article;
   a transducer configured to output ultrasonic waves toward the accommodation space, receive ultrasonic waves reflected from the accommodation space, and generate electric signals corresponding to the received ultrasonic waves; and
   a processor configured to determine a type of the aerosol-generating article accommodated in the accommodation space based on the electric signals generated by the transducer, and control an operation of the heater based on the determined type of the aerosol-generating article,
   wherein the processor is further configured to:
   determine an amount of aerosol generated in the accommodation space based on the electric signals generated by the transducer; and
   control the operation of the heater based on the determined amount of aerosol.

2. The aerosol-generating device of claim 1, wherein the transducer is arranged to be spaced apart from the heater in a longitudinal direction of the aerosol-generating device.

3. The aerosol-generating device of claim 1, wherein the processor is further configured to control the heater to perform a heating operation according to a temperature profile corresponding to the determined type of the aerosol-generating article among a plurality of pre-set temperature profiles.

4. The aerosol-generating device of claim 1, wherein the processor is further configured to compare the determined type of the aerosol-generating article with a type of the aerosol-generating article pre-stored in the aerosol-generating device, and control the heater not to perform a heating operation if the determined type of the aerosol-generating article is different from the type of the aerosol-generating article pre-stored in the aerosol-generating device.

5. The aerosol-generating device of claim 1, wherein the processor is further configured to determine whether the aerosol-generating article has been reused, based on the electric signals generated by the transducer, and control the heater not to heat the aerosol-generating article if it is determined that the aerosol-generating article has been reused.

6. The aerosol-generating device of claim 1, wherein the processor is further configured to stop the operation of the heater if the determined amount of aerosol is less than a critical value at a point in time when a pre-set time has passed after the heater starts the operation thereof.

7. The aerosol-generating device of claim 6, further comprising a user interface,
   wherein the processor is further configured to control the user interface to provide an alarm to remove the aerosol-generating article from the accommodation space, to a user, if the determined amount of aerosol is less than the critical value.

8. The aerosol-generating device of claim 1, wherein the processor is further configured to decrease a heating temperature of the heater if the determined amount of aerosol is equal to or greater than a critical value at a point in time when a pre-set time has passed after the heater starts a heating operation.

9. The aerosol-generating device of claim 1, wherein the transducer includes:
   a first transducer configured to output ultrasonic waves to one region of the accommodation space; and
   a second transducer configured to output ultrasonic waves to another region of the accommodation space, and wherein the processor is further configured to compare an amount of aerosol generated in the one region, which is determined using the first transducer, with an amount of aerosol generated in the another region, which is determined using the second transducer, and control the operation of the heater, based on a result of the comparison.

10. The aerosol-generating device of claim 9, wherein the processor is further configured to stop the operation of the heater if a difference between the amount of aerosol generated in the one region and the amount of aerosol generated in the another region is beyond an error range.

11. The aerosol-generating device of claim 9, further comprising a user interface,
wherein the processor is further configured to control the user interface to provide an alarm to check an accommodation state of the aerosol-generating article, to a user, if a difference between the amount of aerosol generated in the one region and the amount of aerosol generated in the another region is beyond an error range.

* * * * *